United States Patent [19]

Lunsford

[11] 4,324,230
[45] Apr. 13, 1982

[54] SOLAR COLLECTOR PANEL

[76] Inventor: Oscar M. Lunsford, Rte. 2, Box 496, Palm Springs Dr., Longwood, Fla. 32750

[21] Appl. No.: 168,595

[22] Filed: Jul. 14, 1980

[51] Int. Cl.³ .............................................. F24J 3/02
[52] U.S. Cl. .................................. 126/443; 126/436; 126/448; 126/438
[58] Field of Search ............... 126/443, 438, 450, 442, 126/436, 437, 448; 165/168, 104 S

[56] References Cited

U.S. PATENT DOCUMENTS

| 4,155,346 | 5/1979 | Aresty | 126/443 |
| 4,215,674 | 8/1980 | Riggs et al. | 126/443 |
| 4,248,209 | 2/1981 | Wasserman | 126/400 |

FOREIGN PATENT DOCUMENTS 2702560  8/1978  Fed. Rep. of Germany ...... 126/448

*Primary Examiner*—James C. Yeung
*Attorney, Agent, or Firm*—William M. Hobby, III

[57] ABSTRACT

A solar collector panel apparatus is provided which can be easily manufactured in different shapes and capacities. A pair of manifolds is supported in a spaced relationship by one or more conductive tubes. Each tube has a helical wound tube wrapped therearound and having each end operatively connected into one manifold to create a passageway from one manifold to the other. A transparent sleeve is mounted over and spaced from each conductive tube having a helically wound tube thereover and is connected between the manifolds. A reflective material is positioned along one side of each sleeve for reflecting solar energy passing through the sleeve back towards the helically wrapped tube. An input is provided into one manifold and an output from the other manifold. The conductive center tube may be filled with a material, such as a eutectic salt, and act as the supporting framework to hold the manifolds in a spaced, fixed position.

A solar collector test apparatus is also provided, which has solar panel support brackets along with a plurality of infra-red lamps mounted in a lamp shroud and spaced a predetermined distance from the solar panel. A pump passes water through a solar panel mounted on the test stand into a recovery tank which is mounted on scales to determine the amount of water passing through the solar panel. Inlet and outlet temperature, inlet fluid pressure and tank temperature monitors are all connected to the system.

7 Claims, 7 Drawing Figures

SOLAR COLLECTOR PANEL

BACKGROUND OF THE INVENTION

The present invention relates to a solar collector panel which can be easily manufactured in a variety of shapes to fit different applications, and also to a solar collector test panel for testing the efficiency of a solar panel.

In the past, a wide variety of solar heaters and solar panels have been provided for heating hot water and also for heating buildings. A typical solar heater provides a base panel having short sides and a serpentine passageway of pipes passing therethrough. The panel may be covered with glass to prevent the escape of the heat inside of the panel and may have a base coat of black for capturing the heat energy from the sun rays within the glass enclosed panel. Pipes passing through the panel are typically made of copper to absorb the heat in the panel, but a variety of other materials and techniques have also been suggested. Tubing used in solar heaters usually has a smooth straight-flow passageway, so that the liquid passes through the tubing too fast to obtain the maximum benefit of the solar heat. Solar heating panels are typically connected to an electric water heater where the solar heated water can be mixed with electrically heated water as needed to obtain sufficient hot water.

Other prior solar heaters use parabolic dishes, lenses and mirrors to direct the sun rays against tubes which may be painted black. The present solar heater provides for a plurality of heat exchangers each encased in its own transparent sleeve and connected between a pair of manifolds. It can be easily manufactured with one, or a plurality of heat exchangers, of any lengths desired to suit different needs and may be manufactured using mostly conventional components which can be cut to length prior to assembly.

SUMMARY OF THE INVENTION

A solar collector panel is provided having a pair of manifolds and at least one conductive tube fixably connected between a pair of manifolds to support the manifolds in a spaced relationship to each other. Each conductive tube has a helically wound tube, helically wrapped around the conductive tubes and operatively connected to each manifold to create a passageway from one manifold to the other. A transparent sleeve is mounted over the conductive tube and helically wound tube and spaced therefrom and connected between the manifolds. A reflector is located adjacent one side of the sleeve to reflect solar energy passing into the transparent sleeve back into the direction of the helically wound tubes. An input line is connected into one manifold and an output line is connected from the other manifold. The center conductive tube may be filled with a material to act as a heat sink for heat storage and the tube forms the rigid framework with the manifolds eliminating any additional framework.

A controlled input solar collector test unit is also provided in which the solar collector panel mounting brackets can support a solar panel for mounting a plurality of infra-red lamps thereover, which lamps are mounted in a lamp shroud which is lowered over the test panel. A water input line is connected into the input of the solar collector panel being tested and an output line is connected from the solar panel to a recovery tank. The recovery tank is mounted on scales, and the inlet and outlet lines and recovery tank temperatures are monitored along with the inlet pressure so that a controlled amount of energy is directed against the solar panel and the amount of energy collected by the panel can be determined.

BRIEF DESCRIPTION OF THE DRAWINGS

Other objects, features and advantages of the present invention will be apparent from the written description and the drawings in which:

FIG. 4 is a sectional view taken on the line 4—4 of FIG. 1;

FIG. 5 is a sectional view taken on the line 5—5 of FIG. 1;

FIG. 6 is a sectional view taken on the line 6—6 of FIG. 2; and

FIG. 7 is a sectional view taken on the line 7—7 of FIG. 6.

DESCRIPTION OF THE PREFERRED EMBODIMENTS

Figure 1:
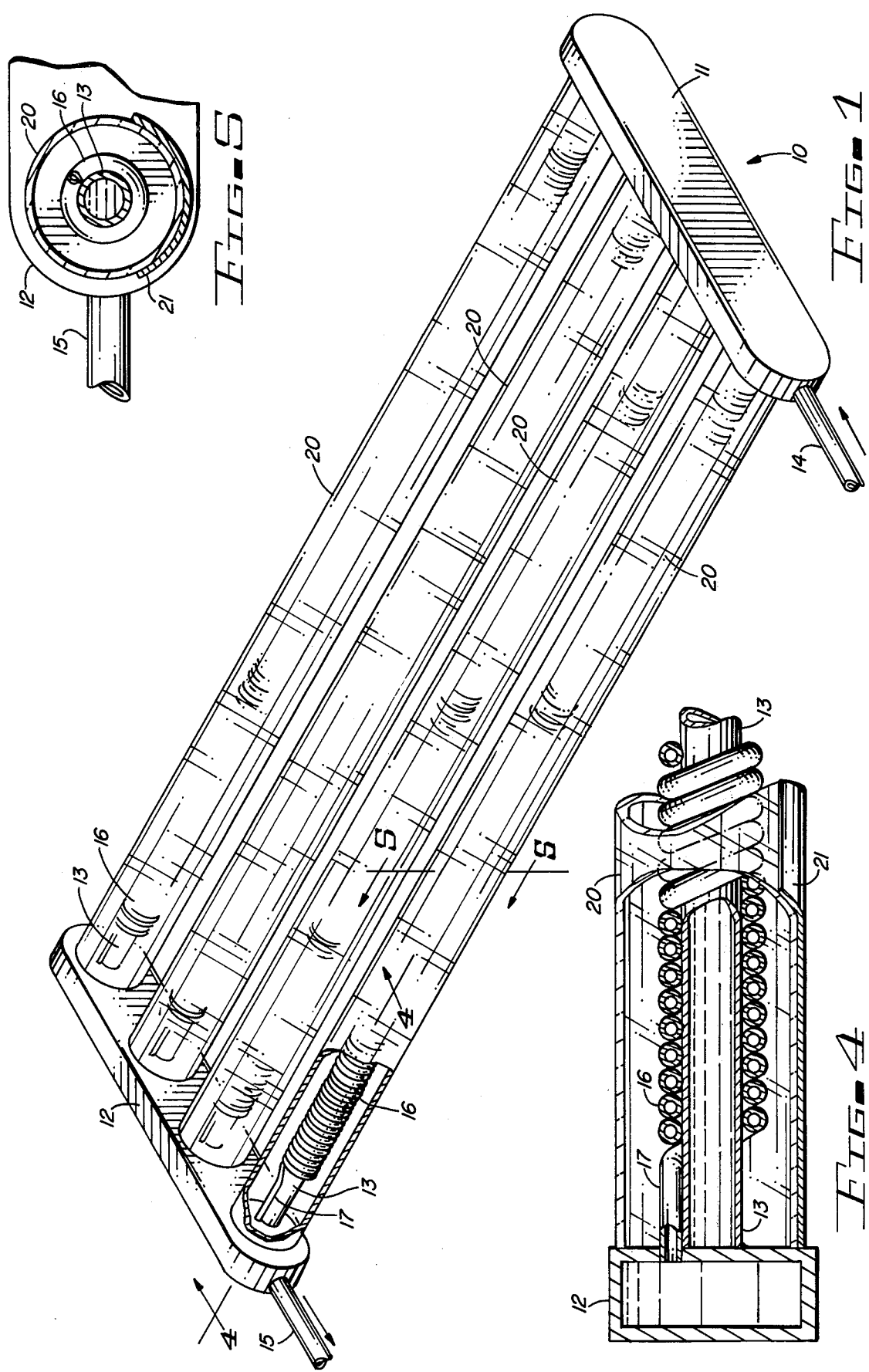
FIG. 1 is a perspective view of a solar collector panel having a plurality of spaced collector tubes.

Referring to FIGS. 1, 4, 5, 6 and 7 of the drawings, two embodiments of a solar collector panel in accordance with the present invention are illustrated. The embodiments are identical except that FIG. 2 has a single solar panel tube, while FIG. 1 has a plurality of solar collection tubes which might typically be shorter than when a single tube is used. In FIGS. 1, 4 and 5, a solar collector panel 10 has a pair of manifolds 11 and 12 supported in spaced relationship by a plurality of conductive tubes 13. The manifolds 11 and 12 are hollow with manifold 11 having an input water line 14 connected thereinto while manifold 12 has a liquid output line 15 connected thereinto. Water is fed into the manifold 11 and passes through helically wound copper tubes 16. Tubes 16 are helically wound around the spaced rigid tubes 13. The helically wound tubes 16 operatively connect into the manifold with each end portion 17 of the tubes 16. The flow of water is through input 14 into the manifold 11 through the helical tube 16 into the manifold 12 and the output 15. Each rigid tube 13 may be filled with a liquid such as a eutectic salt or an oil, which can absorb and store energy for early evening, or to handle a greater demand than the solar system would normally produce in normal usage. Each center tube 13 and wrapped helical tubes 16 is surrounded by a transparent sleeve 20, which is connected between the manifolds 11 and 12. Each transparent tube 20 has a reflective portion 21 which may be a reflective film mounted over a predetermined portion of the sleeve and which would be on the bottom and slightly to the north side of each tube as mounted on a roof. The reflective film 21 can be of a film material or can be deposited onto the sleeves or alternately can be an arcuate thin metal section which can be removably attached to the sleeve 20. Thus, solar passing passing into the sleeves 20 will impinge upon the helical tube 16 or will be reflected by the reflective film 21 back towards the tube 16 and will heat the helical tube 16 directly. As the heat builds up within the sleeves 20 the material in the tube 13 will be heated and will store heat therein until the temperature in the helical tube 16 is lowered by the flow of water through the panel. It should be clear that the rigid tubes 13 can be made of rigid copper tube or any suitable metal cut to any length desired and having the helically wrapped tube 16 wrapped for the particular length of tube 13. In addition, transparent sleeves 20 can be polymer sleeves, such as polycarbonate polymer sleeves, which can be cut to any length desired and to the same length as tubes 13. Thus, by the use of manifolds providing for different numbers of tubes 13 and sleeves 20, a variety of solar panels can be easily assembled to meet different requirements.

Figure 2:
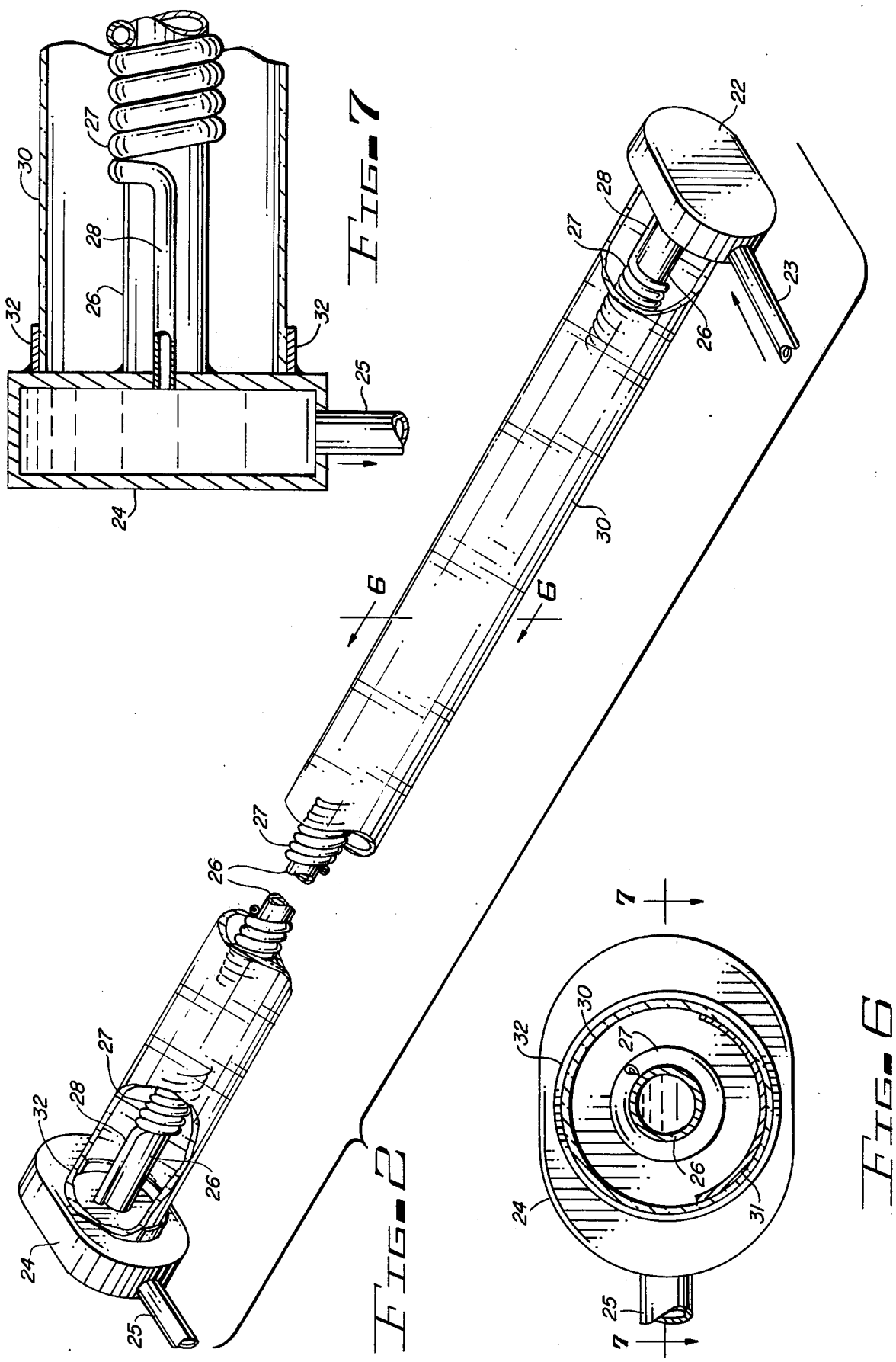
FIG. 2 is a perspective view of a solar collector panel having a single tube.

In FIGS. 2, 6 and 7, a solar panel 21 has a manifold 22 at one end and inlet line 23 and a manifold 24 at the other. Manifold 24 has an outlet line 25 connected thereto. Manifolds 22 and 24 have hollow interiors and are the same as those of FIG. 1, except designed for a single rigid tube 26 connecting the manifolds together. Tube 26 has a smaller tube 27 spirally wrapped therearound and connected at each end 28 to manifolds 22 and 24. Tube 26 is connected to the manifolds 22 and 24 as in FIG. 1, but is not connected through the walls of the manifold. Tube 26 forms a separate enclosed chamber so that a differend liquid, such as a eutectic salt or oil, can be stored therein. Transparent sleeve 30 bas a glazing or reflective film 31 covering a portion thereof to reflect solar energy. A single tube can advantageously be made in a very long length for mounting along an eave or on the ridge of a roof so as to unobtrosive to the ascetic design of the house. A larger helically wound tube 27 would allow a greater volume of water to flow through the longer single tubes.

In addition to the advantages of simplifying the manufacture for a wide variety of units, the present solar collector eliminated the typical solar collector components, such as large copper plates, large pieces of glass or polymer covering sheets and insulated sides and bottoms. The unit would typically be assembled by soldering or brazing the pipes to the manifold and the transparent sleeves can be made slotted along one side so that it can be easily snapped over the pipes if desired. However, other embodiments are to be considered within the scope of the invention and the forms shown are to be considered illustrateive rather than restrictive.

Figure 3:
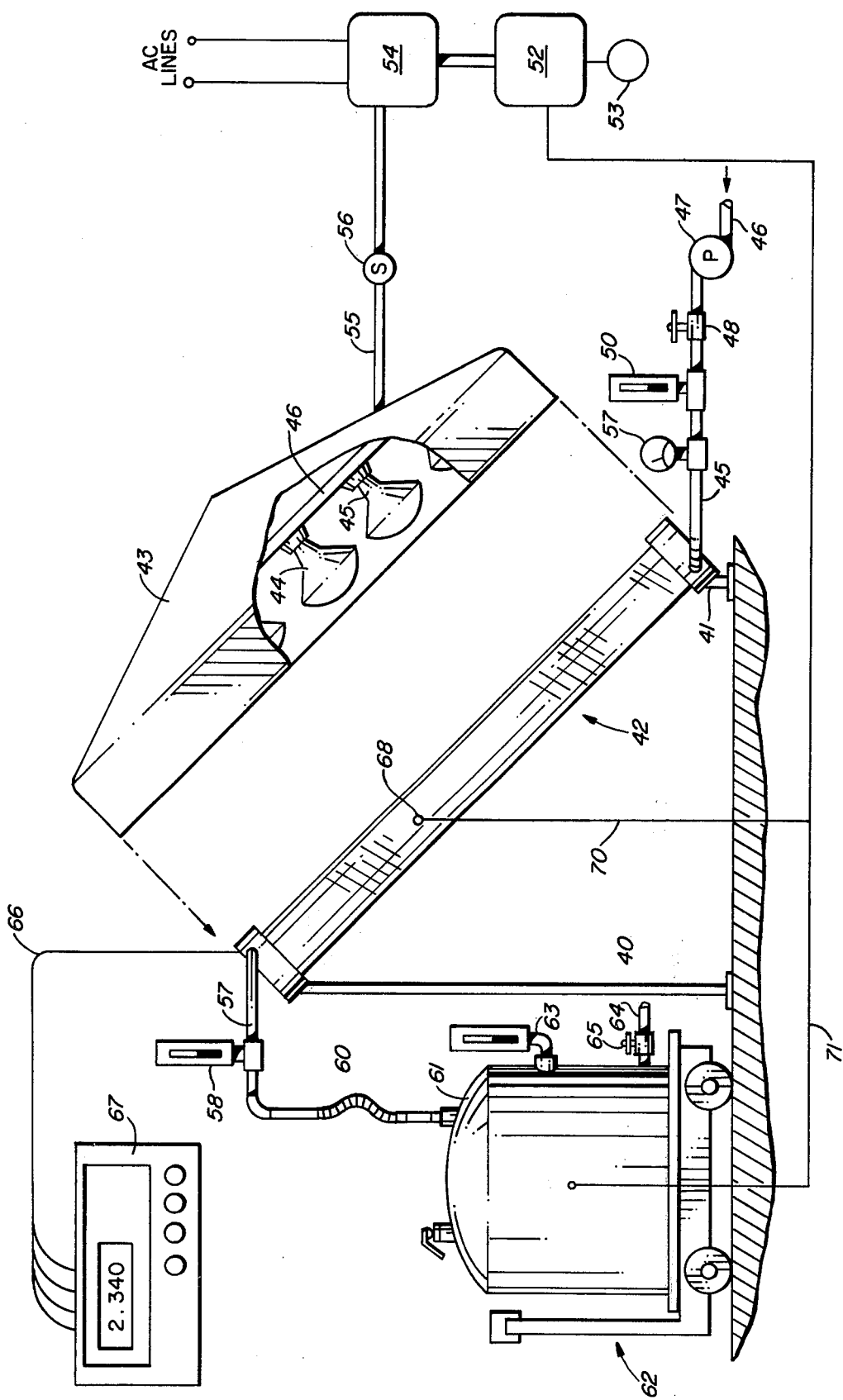
FIG. 3 is a diagrammatic view of a controlled input solar collector test unit.

Turning now to FIG. 3, a diagrammatic view of a controlled input solar collector test unit is illustrated having solar panel mounting brackets 40 and 41 for mounting a solar collector panel 42 therebetween. A lamp shroud 43 has a plurality of infra-red lamps 44 mounted therein in sockets 45 mounted to lamp support members 46 and is adapted to fit over the solar panel 42 spacing the lamps 44 to fit a small distance from the panel 42. The battery of infra-red lamps may be 250 watt lamps, which could produce 854 BTU's per hour each, so that the amount of energy applied to the solar collector panel is of known quantity. The solar panel 42 has an input line 45 connected to a water supply line 46 through a water pump 47 and valve 48. The input line has an inlet temperature monitor 50 and inlet pressure gauge 51. The pump is controlled by pump control unit 52 which is connected through a run meter 53. The pump control 52 is connected to the electrical panel 54 and electrical conductors 55 are connected from the lamps 44 through a switch 56 to the panel 54. The outlet line 57 is connected to the solar panel 42 and at an outlet temperature gauge 58 connected therein and is connected through a flexible pipe 60 to a recovery tank 61, which is positioned on scales 62 for determining the amount of water recovered in a test. A tank temperature gauge 63 measures the temperature of the recovered water passing through the collecting panels and drain 64 and drain valve 65 allows the recovery tank to be drained for the next test. Thermocouples 66 may be connected to a surface monitoring panel 67 for monitoring the temperature of the panel being tested and a temperature sensor 68 may be placed along the tube in the panel 42 to provide a reading through a sensor lead 70, and similarly a sensor can be mounted in the recovery tank and connected through a sensor lead 71, back to the pump control panel 52, to provide a reading at the pump control panel the temperatures of different positions in the system. In this manner, the test unit can measure input flow and pressure and inlet temperature of the liquid. The amount of energy being applied to the solar unit, along with the outlet temperature, the amount of liquid passing through the unit during the test period, and the amount of energy in the recovered liquid provides a reasonably accurate test of the efficiency of the solar panel to assist in designing different configurations of solar panels, as well as comparing the efficiency of one solar panel with another.

The present invention, however, is not to be construed as limited to the form shown, which are to be considered as illustrative rather than restrictive.

I claim:

1. A solar collector panel comprising in combination:
   a pair of manifolds;
   conductive tube means fixedly connected between said pair of manifolds to support said manifolds in space relationship to each other and being filled with a heat storage material;
   helically wound tube means having at least one helically wound tube around one fixed tube of said spaced conductive tube means and operatively connected at each end to one of said manifolds to create a passageway from one manifold to the other;
   transparent sleeve means having at least one sleeve mounted over said conductive tube having a helically wound tube wrapped therearound to provide a space between said helically wound tube and said sleeve, said sleeve being connected between said pair of manifolds;
   reflective means located adjacent said transparent sleeve means to provide a reflective surface over a portion of said transparent sleeve means; and
   input and output means, said input means connected to one manifold to feed a liquid thereto and said output means connected to said other manifold to feed a liquid therefrom, whereby a solar collector panel can be made with one or more collector units of different capacities.

2. A solar collector panel in accordance with claim 1, in which said conductive tube means has a plurality of tubes fixedly connected between said pair of manifolds and said helically wound tube means has a plurality of helically wound tubes each wrapped around one conductive tube and transparent sleeves, one sleeve connected around each said conductive tube having a helically wound tube therearound and connected between said pair of manifolds.

3. A solar collector panel in accordance with claim 2, in which each conductive tube is filled with a eutectic salt.

4. A solar collector panel in accordance with claim 3, in which said reflective means is a reflective film formed on said transparent sleeve.

5. A solar collector panel in accordance with claim 4, in which said transparent sleeve means has a plurality of sleeves each made of a transparent polycarbonate polymer.

6. A solar collector panel in accordance with claim 5, in which said conductive tube means tube and said helically wound tube means helically wound tubes are copper tubes.

7. A solar collector panel in accordance with claim 1, in which said reflective means is a reflective arcuate thin metal section removably attached to the outside of said transparent sleeve means.

* * * * *